June 13, 1961 R. T. MASSENGILL 2,988,124
FAT BACK SKINNING AND TRIMMING MACHINE
Filed Feb. 25, 1954 3 Sheets-Sheet 3
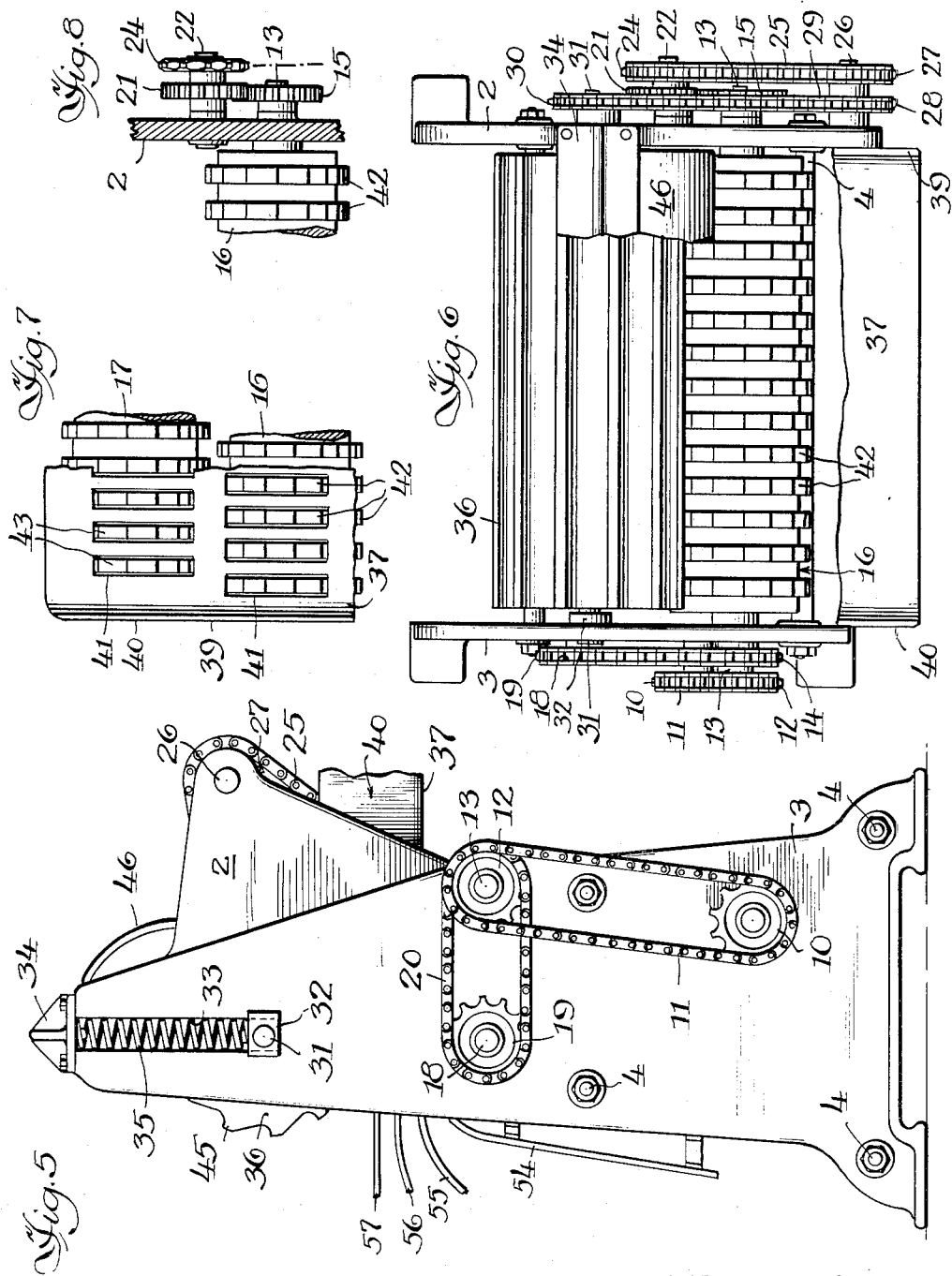
Inventor,
Robert T. Massengill,
By: Schneider & Dressler, Attys

United States Patent Office 2,988,124
Patented June 13, 1961

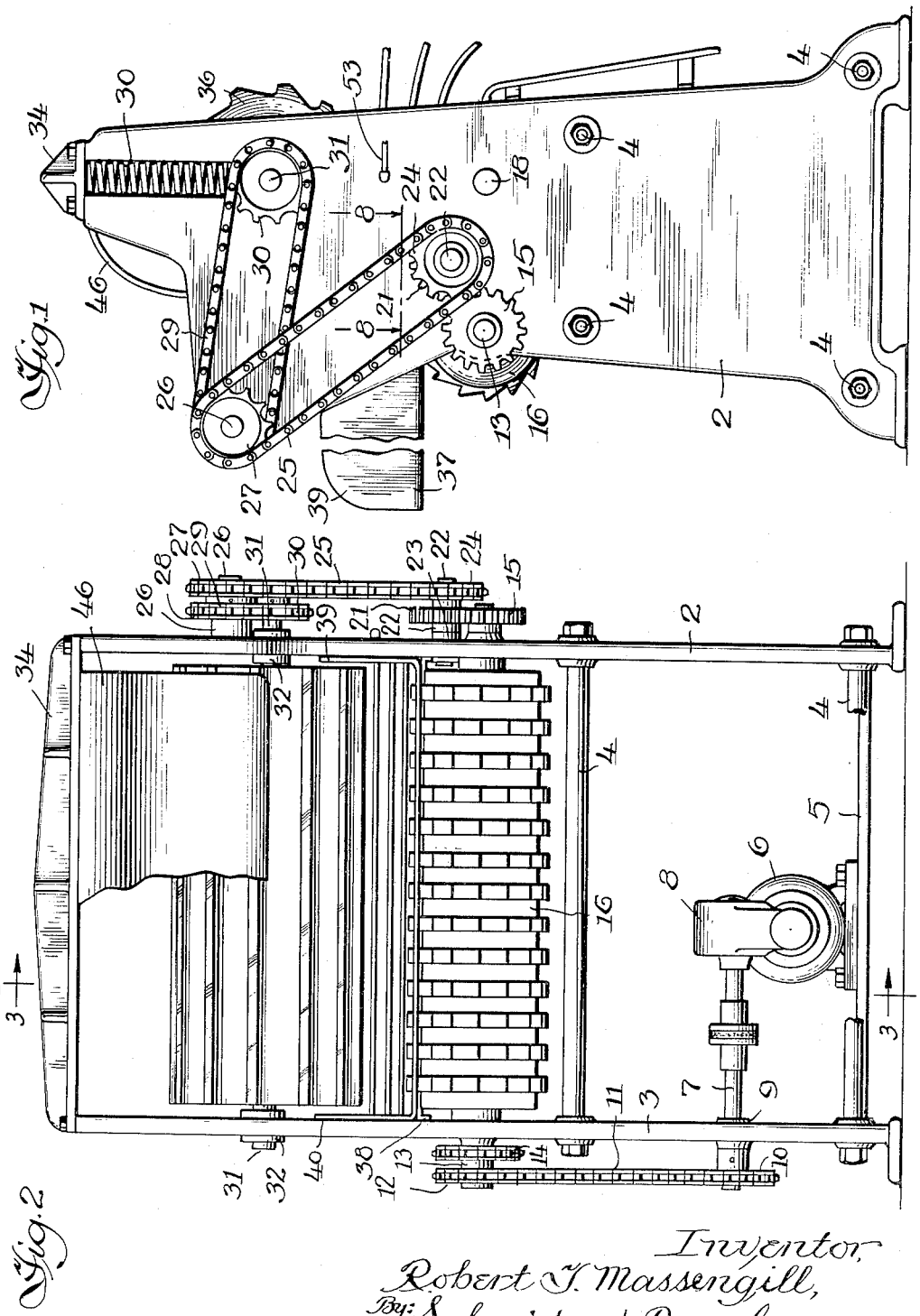

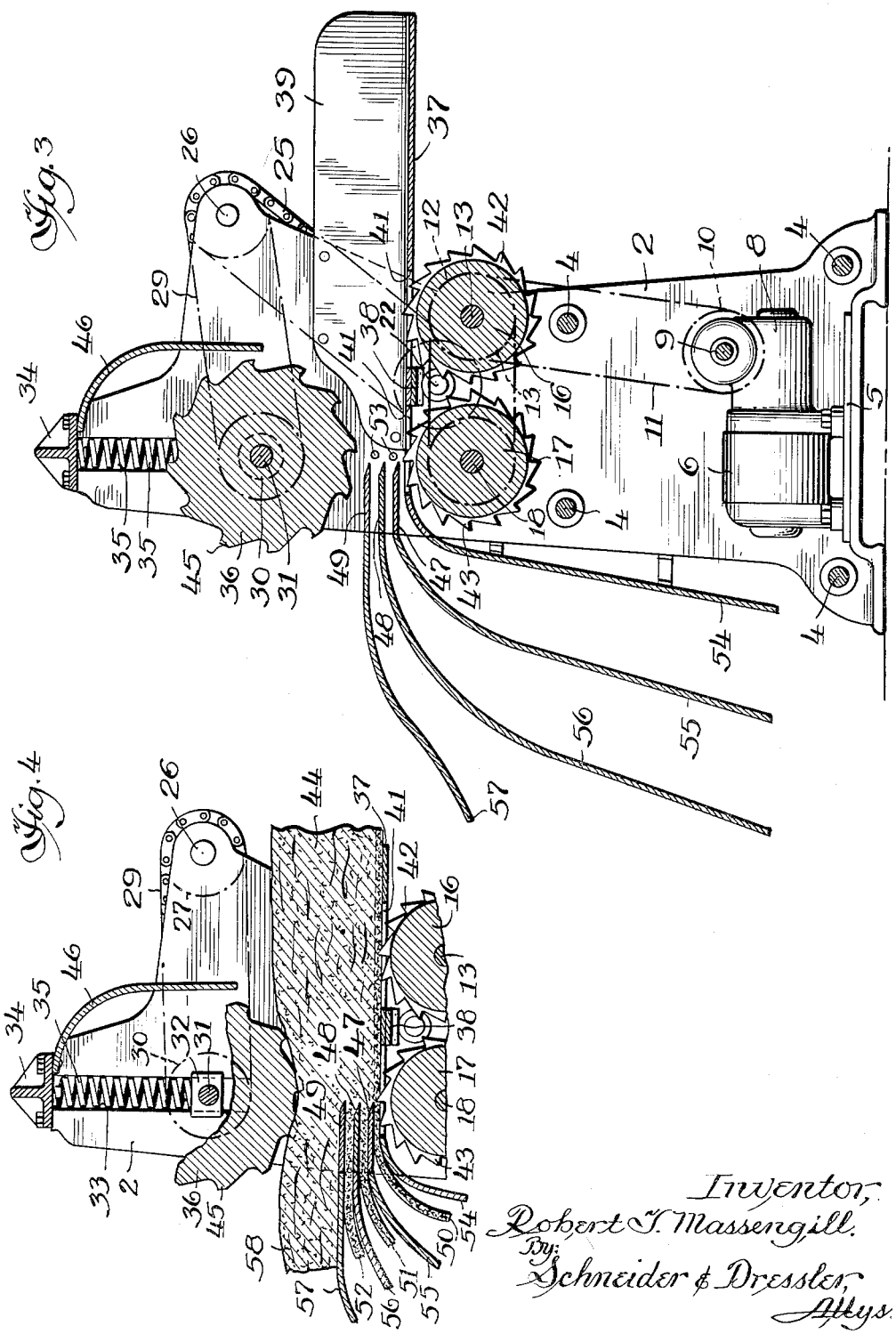

2,988,124
FAT BACK SKINNING AND TRIMMING MACHINE
Robert T. Massengill, Chicago, Ill., assignor to Wilson & Co., Inc., a corporation of Delaware
Filed Feb. 25, 1954, Ser. No. 412,603
4 Claims. (Cl. 146—130)

This invention relates to a machine for removing skin and fat from pork fat backs, and is particularly concerned with means for removing a portion of the fat in a layer of uniform thickness.

Skin and fat have some commercial value, but it has been found that the commercial value of fat may be enhanced considerably if the fat is in the form of a layer of uniform thickness. Such layers of fat are useful for wrapping products such as liver cheese loaf before the product is processed. The layer of fat cooks into the liver cheese during the processing of the liver cheese, and leaves an outer protective covering on the loaf so that the loaf may be kept longer. The fat also adds flavor to the processed loaf and may be cut away to whatever extent desired, at the time the loaf is sliced.

If pork fat backs are not being saved and set aside for curing, they are generally rendered into lard. It is customary in such case before rendering the pork fat backs to remove the skin therefrom, such skin being saved for utilization in the manufacture of gelatin. The skin and fat are often not separated because the increase in value of the separated products does not pay for the cost of separation.

It is possible to remove the skin with a layer of fat and to run the removed skin and fat through a second process to obtain a desirable layer of fat, for liver cheese fat, but the additional handling step is comparatively expensive.

In accordance with the present invention I have devised a machine capable of removing a layer of uniform thickness, taken from a selected portion of the pork fat back, and at the same time removing and discarding the portion of fat lying next to the skin which is ordinarily too tough and may contain hair roots which would make it unsatisfactory for liver cheese fat.

The machine constructed in accordance with the present invention is provided with a platform across which the port fat backs are moved in rapid succession. A pair of driving rollers positioned under the platform project through slots therein to engage the underside of the pork fat backs and cooperate with a spring loaded driving roller engaging the top of the pork fat backs to drive the pork fat backs into engagement with a plurality of slicing blades spaced vertically to remove the skin, an adjacent layer of fat, and the next layer of fat in a single operation. A steam jet or jets are provided to keep the slicing blades clean. Each layer of fat and the skin are carried down different chutes by gravity so that no further handling is necessary to separate the different products.

The structure by which the above mentioned and other advantages of the invention are attained will be described in the following specification, taken in conjunction with the accompanying drawings showing a preferred illustrative embodiment, in which:

FIG. 1 is a side elevation of the machine embodying the invention;

FIG. 2 is a front elevation of the machine with a portion of the guard broken away;

FIG. 3 is a vertical section through the machine, taken along the line 3—3 of FIG. 2;

FIG. 4 is an enlarged fragmentary vertical section, taken along the line 3—3 of FIG. 2, with part of the upper driving roller broken away and showing a pork fat back being sliced by the vertically spaced blades;

FIG. 5 is a side elevation showing the side opposite that shown in FIG. 1;

FIG. 6 is a fragmentary top plan view of the driving rollers and the interconnected gears;

FIG. 7 is a fragmentary top plan view showing the end of the platform through which the lower driving rollers project; and FIG. 8 is a fragmentary sectional view, taken along the line 8—8 of FIG. 1, showing the gears for driving one of the lower driving rollers.

Referring to the drawings, the machine includes a pair of side frame members 2 and 3 held in spaced relationship by a plurality of transverse tie rods 4. A plate 5 secured to the frame members in any suitable manner supports a motor 6 having an output shaft 7 connected thereto through a conventional speed reducer 8. Shaft 7 extends through a bushing 9 in frame member 3, and a sprocket 10 is rigidly secured to the end of the shaft. An endless chain 11 driven by sprocket 10 extends around a sprocket 12 to drive a shaft 13 to which sprocket 12 is rigidly secured. Shaft 13 extends transversely across the machine and carries a sprocket 14 adjacent sprocket 12 and a gear 15 on its other end just outside frame member 2. A driving roller 16 is rigidly mounted on the portion of shaft 13 extending between side frame members 2 and 3.

A roller 17, similar to roller 16, is mounted on a shaft 18 in the same horizontal plane as roller 16, and is spaced rearwardly therefrom. Shaft 18 also extends through both side frame members 2 and 3, and carries a sprocket 19 in the same vertical plane as sprocket 14. An endless chain 20 extends around sprockets 14 and 19 to drive roller 17 in the same direction and at the same speed as roller 16.

Gear 15 meshes with a gear 21 carried by a stub shaft 22 journalled in a bearing 23 mounted in side frame 2. Shaft 22 also carries a sprocket 24 on which an endless chain 25 is mounted. A stub shaft 26 rotatably mounted on side frame 2 carries a pair of sprockets 27 and 28, sprocket 27 being engaged by chain 25. Sprocket 28 is engaged by an endless chain 29 which also extends around a sprocket 30 mounted on a shaft 31. Shaft 31 is journalled in a pair of bearings 32 slidably mounted in vertical slots 33 extending downwardly from the upper ends of said frame members 2 and 3. A top frame member 34 extends across the top of side members 2 and 3 to close the upper ends of slots 33. A pair of springs 35 bearing against each bearing block 32 and top member 34 urges the bearing blocks downwardly towards the closed bottom ends of slots 33. Shaft 31 carries an upper roller 36 between frame members 2 and 3. The closed lower end of slots 33 is positioned a sufficient distance above roller 17 so that roller 36, which is driven by chain 29, is always spaced above roller 17.

A platform 37, extending forwardly of the machine, is supported by a transverse member 38 extending between side frame members 2 and 3. Platform 37 extends the full distance between frame members 2 and 3 and has side walls 39 and 40 positioned adjacent side members 2 and 3, respectively. Platform 37 is provided with a plurality of longitudinal slots 41 spaced transversely across the bottom of the platform in two series aligned with rollers 16 and 17. Each roller 16 and 17 has a plurality of teeth 42 and 43, respectively, projecting through slots 41 to engage the skin side of the pork fat backs 44 placed on platform 37. Roller 36 also has teeth 45 which engage the fat side of the pork fat backs and cooperate with teeth 42 and 43 to push the pork fat backs through the machine. It should be noted that roller 36 is driven at the same speed as rollers 16 and 17, but in the opposite direction, and the teeth of each roller are shaped to bite into the pork fat backs so as to force them through the machine so that the operator does not have to push the pork fat backs after they are engaged by the teeth 42. Springs 35 force roller 36 downwardly to press it against the pork fat backs. A curved front guard 46 extends downwardly from the upper edge of the machine to prevent the operator from throwing any pork fat back directly into engagement with roller 36 and also to protect the arms of an operator who may reach across the machine.

Three slicing blades 47, 48, and 49 are secured at their opposite edges to side frame members 2 and 3 in vertically spaced relationship. Slicing blade 47 is rigidly secured above platform 37 a distance equal to the thickness of the skin 50 so that it separates the skin from the pork fat back. Spacer blocks (not shown) are interposed between blades 47 and 48, and between blades 48 and 49, adjacent the outer edges of said blades, to maintain the blades in predetermined spaced relationship. The spacing between any of the slicing blades may be varied by substituting spacer blocks of different thickness. Slicing blade 48 cuts away the layer 51 of fat next to the skin. This layer of fat is tough and contains the roots of the animal's hair that projects through the skin. The distance between slicing blades 48 and 49 is regulated in accordance with the desired thickness of the layer 52 of fat best suited for wrapping a loaf of liver cheese or any other product to be wrapped in fat before it is processed. The cutting edges of the slicing blades are kept clean by steam jets 53.

A plurality of chutes 54, 55, 56 and 57 are respectively aligned with the rear end of platform 37, knife 47, knife 48, and knife 49 so that the skin is carried from the rear end of the machine by chute 54, the tough layer of fat 51 is carried by chute 55, the layer of fat 52 which is to be used for wrapping liver cheese is carried by chute 56, and the remaining fat portion 58 of the pork fat backs is carried away by chute 57. This separation of the various layers of skin and fat makes it unnecessary to handle the various layers for the purpose of separating them.

Although I have described a preferred embodiment of my invention in considerable detail, it will be understood that the description thereof is intended to be illustrative, rather than restrictive, as many details may be modified or changed without departing from the spirit or scope of the invention. Accordingly, I do not desire to be restricted to the exact details of construction described.

I claim:

1. A machine for removing an intermediate layer of fat of uniform thickness from pork fat backs which comprises a frame, a pair of slicing blades mounted on said frame in vertically spaced relationship, the vertical distance between said slicing blades being equal to the desired thickness of the uniform layer of fat, a platform for supporting pork fat backs as they are moved into engagement with said slicing blades, each of said slicing blades being spaced from the top of said platform a distance greater than the normal thickness of skin of a pork fat back plus the distance inwardly of the skin of a pork fat back normally penetrated by hair roots, a pair of driving rollers having projections extending through the bottom of said platform to engage the underside of pork fat backs placed on said platform, a spring pressed driving roller engaging the top of pork fat backs placed on said platform and cooperating with said pair of driving rollers to move pork fat backs longitudinally of said platform into engagement with said slicing blades to cut said pork fat backs simultaneously along two parallel planes, and means for separating said intermediate layer of fat from the adjacent layers.

2. A machine for removing an intermediate layer of fat of uniform thickness from a pork fat back which comprises a frame, a plurality of vertically spaced slicing blades mounted on said frame, a platform for supporting a pork fat back, each of said slicing blades being spaced from the top of said platform a distance greater than the normal thickness of skin of a pork fat back plus the distance inwardly of the skin of a pork fat back normally penetrated by hair roots, a pair of lower driving rollers and an upper driving roller, spring means urging said upper roller towards said lower rollers, said upper and lower rollers engaging opposite surfaces of a pork fat back placed on said platform, means operatively connected to each of said rollers for rotating each of said rollers simultaneously to drive said pork fat back past said slicing blades to cut said pork fat backs simultaneously along two parallel planes, and means for separating said intermediate layer of fat from the adjacent layers.

3. A machine for removing an intermediate layer of fat of uniform thickness from a pork fat back which comprises a frame, a plurality of vertically spaced slicing blades mounted on said frame, a platform for supporting a pork fat back, a pair of lower driving rollers and an upper driving roller, spring means urging said upper roller towards said lower rollers, a plurality of slots in the bottom of said platform, a plurality of teeth projecting from the periphery of each of said lower rollers, said teeth extending through said slots, a plurality of teeth projecting from the periphery of said upper roller, the teeth projecting from said upper and lower rollers engaging opposite surfaces of a pork fat back placed on said platform, means operatively connected to each of said rollers for rotating said rollers simultaneously to drive said pork fat back past said slicing blades to cut said pork fat backs simultaneously along two parallel planes, and means for separating said intermediate layer of fat from the adjacent layers.

4. A machine for trimming pork fat backs, comprising a platform for supporting a pork fat back, a pair of driving rollers below said platform, a plurality of slots in said platform, teeth projecting from said driving rollers through said slots into engagement with the underside of a pork fat back supported on said platform, a spring loaded driving roller engaging the top surface of said pork fat back and cooperating with said lower driving rollers to move said pork fat back longitudinally of said machine, a slicing blade engageable with said pork fat back to remove the skin therefrom, a second slicing blade positioned vertically from said first slicing blade to remove a layer of fat adjacent said skin, a third slicing blade spaced vertically from said second slicing blade to remove the next adjacent layer of fat of said pork fat back, means operatively connected to each of said rollers for driving said rollers to move said pork fat back past said slicing blades to cut said pork fat backs simultaneously along three parallel planes, and four separate chutes aligned respectively with the rear end of said platform and with the rear end of each of said slicing blades, each of said chutes being adapted to convey sliced portions of pork fat backs separately to different areas.

References Cited in the file of this patent
UNITED STATES PATENTS

| | | |
|---|---|---|
| 653,137 | Feiten | July 3, 1900 |
| 657,322 | Tailiaferro | Sept. 4, 1900 |
| 782,992 | Schmidt et al. | Feb. 21, 1905 |
| 1,847,536 | Pruefer | Mar. 1, 1932 |
| 2,115,102 | Gottfried et al. | Apr. 26, 1938 |
| 2,362,492 | Livermon | Nov. 14, 1944 |
| 2,503,975 | Sutton | Apr. 11, 1950 |
| 2,539,692 | Hickman et al. | Jan. 30, 1951 |
| 2,715,427 | Townsend | Aug. 16, 1955 |